(Model.)
D. W. ORCUTT.
ROPE CLUTCH.
No. 520,570. Patented May 29, 1894.
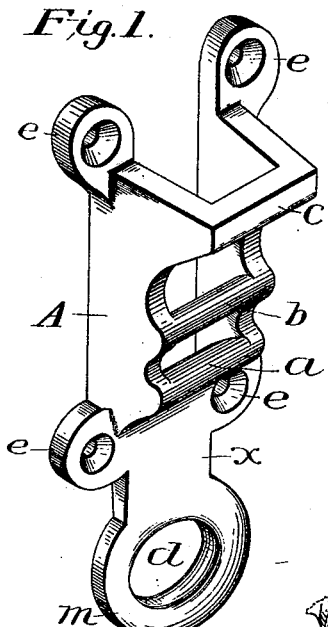
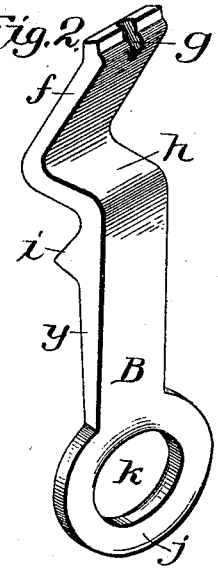
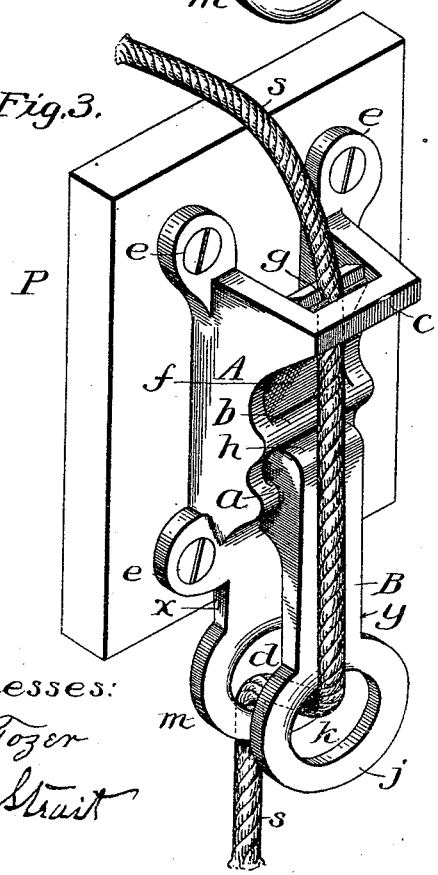
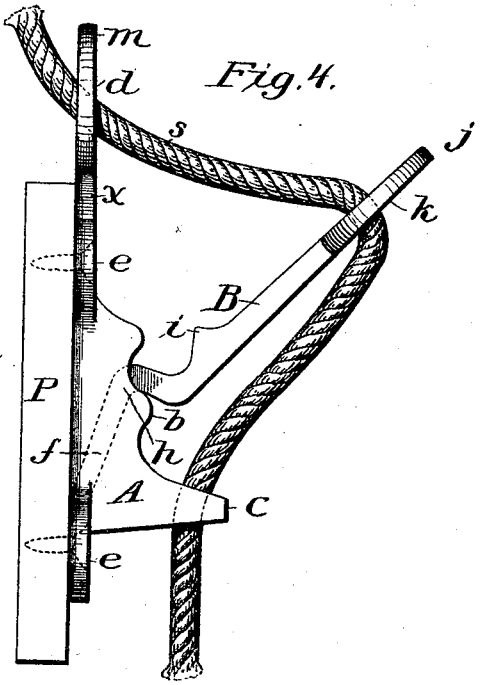
Witnesses:
R. E. Tozer
Geo. F. Strait
Inventor:
David W. Orcutt
by his attorney
J. E. Bookstaver

UNITED STATES PATENT OFFICE.

DAVID WARD ORCUTT, OF BINGHAMTON, NEW YORK.

ROPE-CLUTCH.

SPECIFICATION forming part of Letters Patent No. 520,570, dated May 29, 1894.

Application filed March 18, 1893. Serial No. 466,706. (Model.)

*To all whom it may concern:*

Be it known that I, DAVID WARD ORCUTT, a citizen of the United States, residing at Binghamton, in the county of Broome and State of New York, have invented certain new and useful Improvements in Rope-Clutches, of which the following is a specification; and I do hereby declare that the following pages of specification is a full, clear, and exact description of the invention, which will enable others skilled in the art to which it appertains to make and use the same, reference being had to the accompanying drawings, forming part thereof.

The object of my invention is to provide an improved device by which a rope, line, or cord can be quickly and effectively clutched when stretched; and I attain this object by a combination of the two pieces of mechanism illustrated in the accompanying drawings, in which—

Figure 1. is a view in perspective of one of the pieces of my device, and which I term the clutch box. Fig. 2. is a view in perspective, of the companion piece of my device, and which I term the lever tongue. Fig. 3. is a view in perspective, of the lever tongue and the clutch box of my device in combination, secured to a post or block, and having a rope in position through it. Fig. 4. is a side elevation of the two pieces of my device in combination, illustrating how the lever tongue is prevented from falling out, or from being taken out of the clutch box when secured to a post.

My device is composed of two pieces, the clutch box (A) and the lever tongue (B). Both are made of metal, and intended to be secured to a post. The clutch box has the eyes (e) at its sides for screws, and is open on top and bottom. At its end it is provided with a crossbar, c, another one at (b) and a fulcrum at (a). See Fig. 1. The end bar (c) is higher than bar (b), and from bar b the clutch box runs down to the fulcrum a and then down into the flat handle (x) to the other end, which is shaped into the round ring (m) with its opening (d). The lever tongue (B) is of nearly the same length, and has a similar flat handle (y), terminating in a similar ring (j) with opening (k); but the upper part is curved into the two unequal curves (i) and (h) Fig. 2., the short curve in the under side, and the long curve in the upper side, and has the notch (g) at the tip (f). When the tip (f) of the lever tongue is inserted under the bar (b) of the clutch box, and the ring (j) is brought down parallel with the ring (m), the tip (f) comes in contact with the bar (c).

In use, the clutch box is secured to a post or suitable support, and the rope is run through between the lever tongue tip (f) which is provided with the notch (g) for the rope (s), and the bar (c) in the clutch box, and then down through the ring (j), and then through the ring (m). If the rope be then drawn from between the tip (f) and the bar (c), it will draw freely; but when drawn in the opposite direction, through the rings, the tip (f) binds against the bar (c) and grips the rope. To prevent the lever tongue from falling out of the clutch box, the curve (h) is made of such proportions that the tip will strike the post support and hold the lever tongue fast in the clutch box. The curve (i) articulates with the edge (a) of the clutch box upon which it acts as upon a fulcrum. The device, in operation, will hold tightly a tent rope, clothes line, flag or sail halyards, or halter. If it is desired to loosen the rope, it can be done by pressing apart the rings (m) and (j), when the rope can easily be drawn out from between the tip (f) and the bar (c).

What I claim as my invention is—

1. In a rope clutching device, the lever (B) having the straight handle (y) with the ring (j), the short curve (i) on the under side, and the long curve (h) on the upper side, and the notch (g) in the tip (f); substantially as described, and for the purpose specified.

2. In a rope clutching device, the clutch box (A), with the stop bars (c) and (b), the fulcrum (a), and the ring (m), substantially as described, and for the purpose specified.

3. In a rope clutching device, the combination of the clutch box (A) with its cross bars (c) and (b) and ring (m), with the lever tongue (B) having curves (i) and (h) fulcrumed upon the clutch box, the ring (j), and the tongue tip (f) said tip (f) closing against the bar (c) upon a downward pressure of the ring (j) when a rope is pulled through between them and downward through the said rings, substantially as described, and for the purpose specified.

DAVID WARD ORCUTT.

Witnesses:
   JULIA FRENCH,
   CLARA BOOKSTÄVER.